United States Patent Office 2,985,492
Patented May 23, 1961

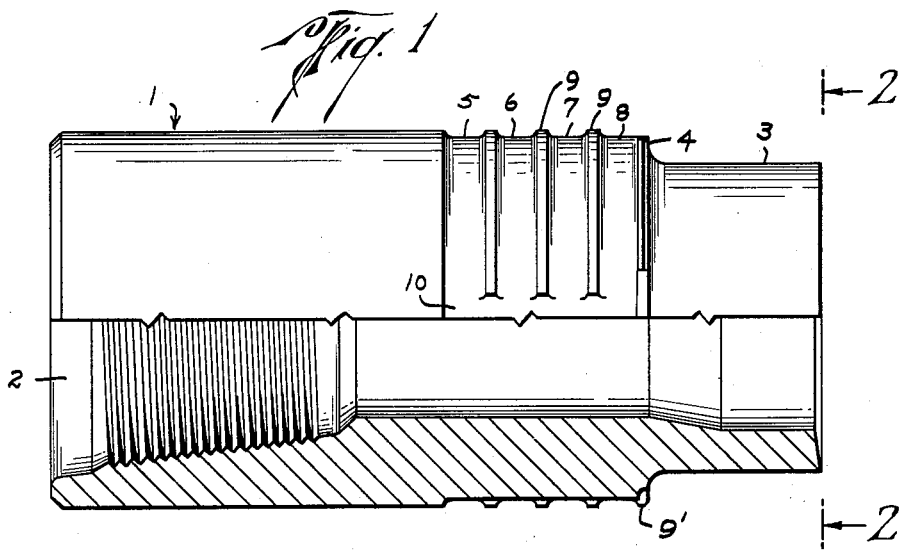
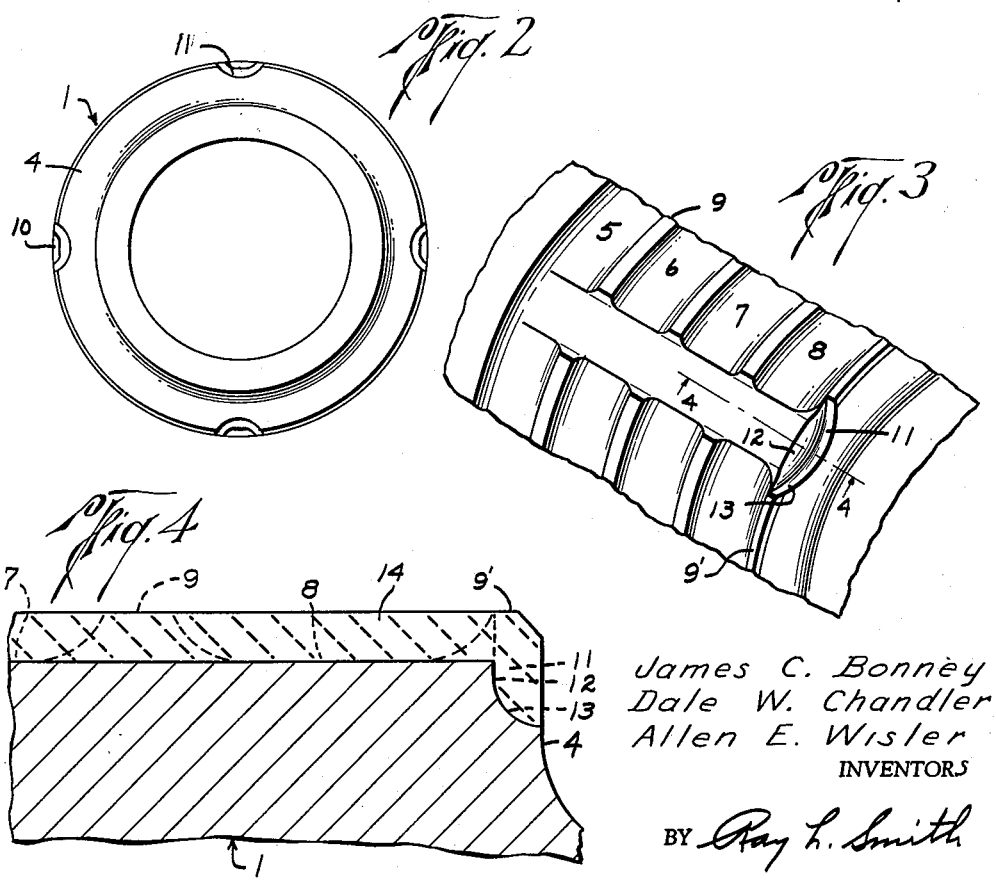
James C. Bonney
Dale W. Chandler
Allen E. Wisler
INVENTORS
BY Ray L. Smith
ATTORNEY

2,985,492

PROTECTION OF TOOL JOINTS

James C. Bonney, Dale W. Chandler, and Allen E. Wisler, Houston, Tex., assignors to Hughes Tool Company, Houston, Tex., a corporation of Delaware Filed Sept. 5, 1958, Ser. No. 759,240

6 Claims. (Cl. 308—4)

This invention relates to tool joints used as special couplings to interconnect successive sections of drill pipe forming the drill string in the rotary method of drilling earth bores. More particularly the invention relates to the provision of adequate hard surfacing of tool joints having square end shoulders.

It has been proposed, as shown in Neuhaus Patent No. 2,334,350, to fortify a tool joint member against wear by providing a plurality of bands of wear resistant material upon and bonded to the member. Difficulty has been experienced from such construction from undercutting of the lands of the joint body metal between adjacent bands after which a breaking away of the wear resistant metal progressively takes place. This condition has been greatly ameliorated by providing circumferentially spaced deposits of wear resistant material bridging and integrated with successive bands of wear resistant material, as shown in Lewis and Moore Patent No. 2,653,061.

In the case of tool joints which terminate in square shoulders which are exposed to destructive influences of wear and impact in normal use it has been found that, even though the prior art teachings are utilized, excessive and progressive destruction results from undercutting of the outermost portion of the wear resistant material and this is followed by rapid deterioration of the tool joint, a condition which the application of hard facing is intended to prevent.

The primary object of the invention is the provision of a square shouldered tool joint embodying a practical application of wear resistant material whereby the above mentioned difficulties are eliminated.

Another object is to provide hard facing on a square-shouldered tool joint in a manner to prevent undercutting of the hard facing material and particularly to prevent undercutting of the outermost portion of such material, from which progressive failure takes place.

Another and more specific object is to provide abrasion and impact protection for a square-shouldered tool joint by applying a plurality of bands of wear resistant material thereon, such bands being interbonded at circumferentially spaced points and the outermost of said bands being interbonded with spaced pads of wear resistant material embedded in the radially extending shoulder of the tool joint.

These and other objects will be more fully apparent from the following description and the drawings illustrating an embodiment of the invention and in which:

Fig. 1 is a side elevational view, partly in section, showing a tool joint member grooved to receive hard facing material in accordance with one form of the invention;

Fig. 2 is an elevational view taken on line 2—2 in Fig. 1;

Fig. 3 is an enlarged detail, in perspective, showing one manner of providing a recess in the radial shoulder on the tool joint to assure an interbonding and integration of the shoulder pad with the outermost band of wear resistant material;

Fig. 4 is a detail sectional view on line 4—4 of Fig. 3 and showing the wear resistant metal bonded in place on the joint.

It is to be understood that a tool joint comprises a pair of tool joint members of special alloy steel. Such members have one end provided with a pin and box connection which is readily made up or broken out so that successive drill stem sections may be readily connected or disconnected as sections are added or removed during drilling or when lowering the spring into a hole or removing it from the hole. The other end of each tool joint member is so constructed that it may be secured to the end of a section of drill pipe as by a threaded connection or by welding. For sake of convenience and clarity a single tool joint member is shown and described.

The tool joint member 1 has a threaded box 2 at one end for attachment to the complemental pin end of a mating tool joint member, not shown. The other end 3 of the member 1 is shown as prepared for welding to a section of drill pipe, although provision may be made for a threaded connection between the tool joint and the drill pipe. The end 3 is reduced in cross section thus forming a shoulder 4 facing axially of the member. It is this shoulder that is engaged by the elevator or clamp which is utilized to engage the drill pipe when raising or lowering the drill string during drilling operations.

As best seen in Figs. 1 and 3 the surface of the member 1 is preferably provided with a plurality of grooves 5, 6, 7, and 8 with intervening lands 9 of which the outermost is proximate the shoulder 4. One or more grooves 10 extending axially of the member 1 transect the lands 9 thereby providing interconnected grooves which are filled with a wear resistant material bonded to the bottoms and sides of the grooves to provide desired wear resistant properties for the tool joint.

It has been found that when using a tool joint as thus far described there is a tendency for the outermost of the lands 9, also identified as 9' for purposes of reference, to wear rapidly from normal attrition and also to become deformed from engagement by the elevators thereby accelerating the effect of attrition. Thus undercutting of wear resistant material in the outermost groove takes place and this is followed by a progressive disintegration of the wear resistant material.

An important feature of the invention resides in the structure which serves the dual purpose of resisting deformation from stresses applied to the shoulder 4 by the elevators and also minimizing attrition of the land 9' and hence initiation of undercutting of the outermost band of wear resistant material. We have found that this purpose can be accomplished by providing in the shoulder 4 a plurality of recesses 11. Preferably these recesses extend arcuately inwardly from the periphery of the land 9', are substantially flat bottomed, and are of a depth to extend completely through the land 9'. This assures that wear resistant metal deposited in the respective recesses will not only bond to the bottom 12 and the sidewalls 13 of the recesses 11 but will also bond directly with the outermost band of wear resistant metal deposited in the groove 8. It is also to be noted that the recess 11 extends only a portion of the radial dimension of the shoulder 4. Approximately one-half of this dimension is a desired radial depth of the recess 11.

Fig. 4 shows in enlarged detail a section longitudinally of the tool joint along one of the grooves 10 and through one of the recesses 11, wear resistant material 14 filling and being bonded to the bottom and sides of the respective grooves and recesses.

Preferably the recesses 11 are in alignment with the longitudinal grooves 10. However, such recesses may be greater or fewer in number than the grooves 10 and may be angularly displaced therefrom. A more important consideration is that the recesses 11 shall be of a depth axially of the tool joint 1 to completely traverse the axial extent of the land 9' to assure integration of the metal deposited in the recess 11 with that of the outermost band of metal on the periphery of the tool joint member 1. This is clearly accomplished as illustrated in Fig. 4 of the drawings.

Broadly the invention comprehends a tool joint having a square end shoulder and wear resistant metal deposited thereon in a manner to minimize attrition from normal use.

The invention claimed is:

1. In a wear resistant tool joint member having a square end shoulder and wear resistant material bonded to the member to resist attrition from normal use, a plurality of spaced circumferential grooves in the surface of the member, there being a circumferential land between the outermost groove and said shoulder, a plurality of radially extending recesses in the end shoulder and of a depth axially of the member to transect said outermost land, and a quantity of wear resistant material filling each of said grooves and recesses and bonded to the bottoms and side walls thereof.

2. In a wear resistant tool joint member having a square end shoulder and wear resistant material bonded to the member to resist attrition from normal use, a plurality of spaced circumferential grooves in the surface of the member, there being a circumferential land between the outermost groove and said shoulder, a plurality of grooves extending longitudinally of the member and transecting the lands between said first mentioned grooves, a plurality of radially extending recesses in the end shoulder and of a depth axially of the member to transect said outermost land, and a quantity of wear resistant material filling each of said grooves and recesses and bonded to the bottoms and side walls thereof.

3. In a wear resistant tool joint member having a square end shoulder and wear resistant material bonded to the member to resist attrition from normal use, a plurality of spaced circumferential grooves in the surface of the member, there being a circumferential land between the outermost groove and said shoulder, a plurality of grooves extending longitudinally of the member and transecting the lands between said first mentioned grooves, a radially extending recess in the end shoulder at the outer end of each of said longitudinally extending grooves, said recesses being of a depth to transect the outermost land and thereby communicating with said grooves, and a quantity of wear resistant material filling each of said grooves and recesses and bonded to the bottoms and side walls thereof.

4. In a wear resistant tool joint member having a square shoulder and wear resistant material bonded to the member to resist attrition from normal use, a plurality of spaced circumferential bands of wear resistant material bonded to the member, arcuately spaced areas of said material bonded to the member and interbonded with successive bands, a plurality of radially extending recesses in the shoulder extending outwardly to the periphery of the tool joint member and of a depth axially of the member to extend to the outermost of said bands, and a body of wear resistant material filling each of said recesses and bonded to the walls of the recesses and to said outermost band.

5. In a wear resistant tool joint member having a square shoulder and wear resistant material bonded to the member to resist attrition from normal use, a band of wear resistant material bonded to the member proximate said shoulder, a plurality of radially and axially extending recesses in said shoulder, each of said recesses extending to the periphery of the tool joint member and being of an axial depth to extend to said band, and a body of wear resistant material filling each of said recesses and bonded to the walls of the recesses and to said band.

6. In a wear resistant tool joint member having a square shoulder and wear resistant material bonded to the member to resist attrition from normal use, a band of wear resistant material bonded to the member proximate said shoulder, a plurality of radially and axially extending recesses in said shoulder, each of said recesses extending to the periphery of the tool joint member and having a substantially flat bottom and a depth axially of the member extending to said band, and a body of wear resistant material filling each of said recesses and bonded to the walls thereof and to said band.

References Cited in the file of this patent
UNITED STATES PATENTS

| | | |
|---|---|---|
| 2,049,265 | Kinney | July 28, 1936 |
| 2,247,173 | Huntsinger | June 24, 1941 |
| 2,334,350 | Neuhaus | Nov. 16, 1943 |
| 2,653,061 | Lewis et al. | Sept. 22, 1953 |